Figure 1:
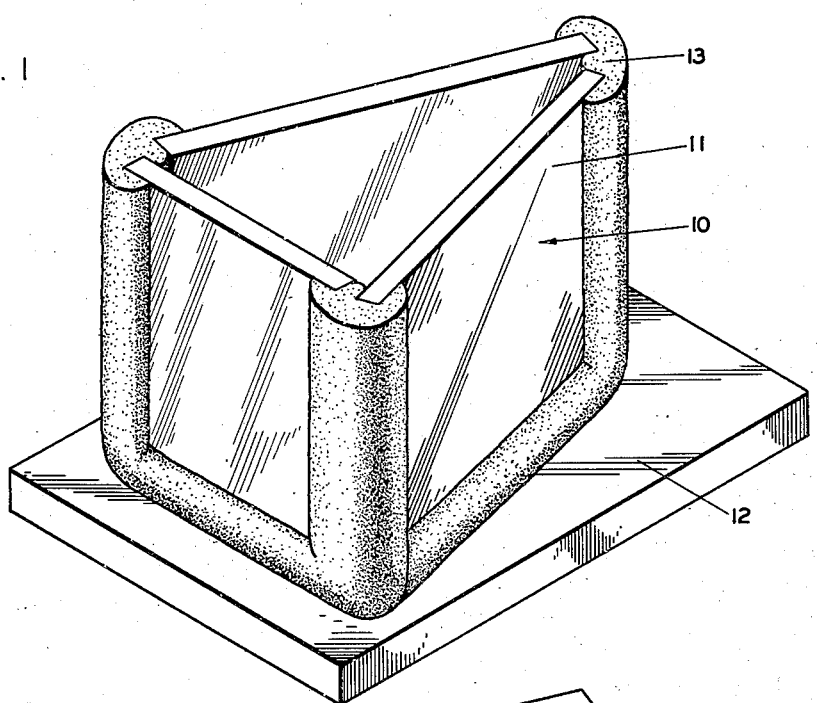

Oct. 22, 1946.  H. G. ROGERS ET AL  2,409,958
METHOD OF MOLDING PRISMS
Filed April 16, 1943

Howard G. Rogers
and
Dexter P. Cooper Jr.
INVENTORS

BY Donald L. Brown
ATTORNEY

Patented Oct. 22, 1946

2,409,958

UNITED STATES PATENT OFFICE 2,409,958

METHOD OF MOLDING PRISMS

Howard G. Rogers, Wellesley Hills, Mass., and Dexter P. Cooper, Jr., Washington, D. C., assignors to Polaroid Corporation, Cambridge, Mass., a corporation of Delaware Application April 16, 1943, Serial No. 483,308

13 Claims. (Cl. 18—58)

This invention relates to the formation of rigid elements from organic plastics and resins and more particularly to methods of hardening polymerizable materials in a mold to accurately impart a desired shape thereto.

One object of the present invention is to provide a novel method of molding an optical element, such as a prism, from a polymerizable material, as for example styrene, cyclohexyl methacrylate or methyl methacrylate, whereby the deleterious effects of shrinkage during hardening are greatly minimized.

Further objects of the invention are the provision of a novel method of hardening a plastic in a mold which consists in freeing the mold elements for relative movement after a preliminary hardening of the plastic, and the inclusion in said method of novel steps for automatically freeing said elements in the desired manner.

The above and other objects and novel features of the invention will more fully appear from the following detailed description when the same is read in connection with the accompanying drawing. It is to be expressly understood, however, that the drawing is for purposes of illustration only and is not intended as a definition of the limits of the invention, reference being primarily had for this latter purpose to the appended claims.

Figure 2:
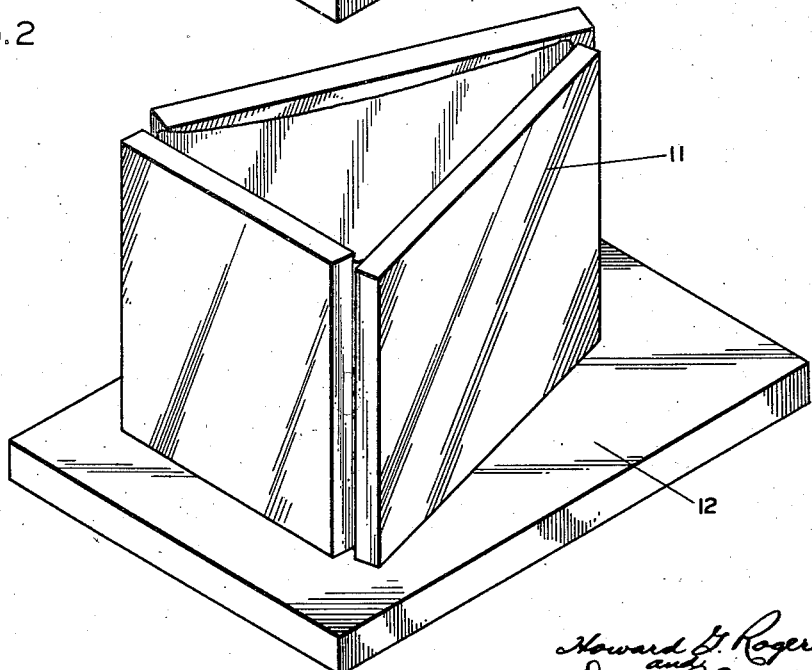

In the drawing, wherein like reference characters refer to like parts throughout the several views:

Figure 1 is a perspective view of a molding apparatus for carrying out the method of the invention; and Fig. 2 is a perspective view showing said apparatus in a later stage of the process.

The formation in molds of accurately surfaced optical elements, such as prisms, from organic resins and plastics, has involved the development of molding methods whereby suitable compensation is made for the shrinkage which occurs when polymerization of the resin or plastic is advanced through the hardening stage. The shrinkage tends to cause the hardened product to pull away from the mold surfaces, creating surface irregularities and internal strains and destroying the homogeneity of the product. According to the present invention these undesirable effects of shrinkage are substantially minimized, if not avoided, by carrying out the hardening of the plastic in two stages, and by suitably freeing the mold elements for movement during the final stage.

In the fabrication, for example of triangular prisms from styrene, a suitable mold 10 is provided comprising a plurality of optically flat plates 11, preferably of glass, a separate plate defining each of the prism faces. Plates 11 are so arranged that the edges thereof are not in contact with one another, being separated by at least the amount of shrinkage expected during the hardening stage of polymerization. An end plate 12 abuts plates 11 to close off one end of the mold and said plates are bonded together and rigidly held in position by a suitable cement 13. The latter is of a type that can be readily removed or separated from plates 11 and 12, as by fusion or by being mechanically scraped or pried therefrom, the removal being desired to the extent of not inhibiting free movement of said plates relative to each other. Preferred materials for the cement are Belmont alloy 255 or Wood's metal.

The moldable material which is preferably a partially polymerized styrene or cyclohexyl methacrylate monomer solution, is poured into the open end of said mold 10, and the mold and the contents thereof are then baked, or otherwise treated, in order to advance the polymerization of the solution until a substantially rigid product is obtained. For styrene the initial baking preferably is carried out at temperatures between 25 and 40 degrees C. for from one to two days, depending on the size of the product being molded. Larger masses of material are baked at the lower temperatures for a longer time. Excessive baking during this first stage of hardening has been determined to have no undesirable effects on the finished product and accordingly the baking is continued until a hardened product is assured.

At the completion of the initial baking, cement 13 is removed from plates 11 and 12 without affecting the bond between plates 11 and the surfaces defined thereby. Plates 11 are thus adhesively retained in full contact with the faces of the hardened product but are free to move with said faces upon contraction of said product. Thereafter the mold walls and the product are subjected to further heating, preferably at a higher temperature than the initial heating, as for example between 80 degrees and 90 degrees C., for approximately 24 hours. This second baking relieves internal strains in the product by permitting contraction thereof and advances polymerization to substantial completion, the mold walls 11 serving to maintain the surfaces optically smooth during contraction.

At the completion of the second stage of hardening, plates 11 and 12 may be removed from the hardened product by immersing the mold and the formed prism into a water bath maintained at the same temperature as that at which said second stage of hardening was carried out, said bath containing a surface active agent, such as "Aerosol O. T." A one-percent solution of "Aerosol" has proved satisfactory.

Unless the removal of the cement is carried out at the temperature of the initial bake or at a higher temperature, undesirable separation of the mold walls from the molded product may take place during said removal. To avoid this occurrence, it is preferable to select cement 14 from the class of fusible materials having their melting points between the temperatures at which the initial and final stages of the hardening are carried out. A preferred cement of this type is Wood's metal, which has a melting point of 67 degrees C. and which produces a good bond between plates 11 and 12 when solid. By utilizing a cement of this character, the second baking fuses the cement and automatically releases the mold walls for relative movement.

While it is preferable to effect the second stage of hardening at the higher temperature, it is to be understood that the temperature of the second bake may be carried out at the same temperature as the first.

There is thus provided a novel method of forming optical or other elements having highly accurate surfaces by casting the latter in molds, novel steps being taken to obviate the effects of shrinkage on the molded product. There is also provided a novel method of securing together the elements of a mold structure whereby said elements are automatically released from one another at a desired point in the molding process.

Since certain changes in carrying out the above method may be made without departing from its scope, it is intended that all matter contained in the above description or shown in the accompanying drawing shall be interpreted as illustrative and not in a limiting sense. For example, it is to be expressly understood that the method comprehended by the invention could be utilized to fabricate lenses or prismatic members other than triangular.

It is also to be understood that the following claims are intended to cover all the generic and specific features of the invention herein described, and all statements of the scope of the invention which, as a matter of language, might be said to fall therebetween.

What is claimed is:

1. The method of fabricating an optical element which comprises rigidly securing together a plurality of mold parts to form a mold having the contour of said element, said parts being spaced from one another so as to permit movement thereof toward one another upon removal of the securing means, introducing a flowable polymerizable mass into said mold, which mass, in its hardened, partially polymerized condition, adheres to said mold and which is adapted, upon substantially complete polymerization, to form a transparent, inherently rigid mass, advancing the polymerization of said flowable mass to produce a hard partially polymerized material to which the mold parts adhere, releasing the mold parts from one another without affecting the engagement between said parts and the surfaces of the hardened product defined by said parts, and advancing the polymerization of said mass to substantial completion to produce a transparent, inherently rigid mass with said parts attached to the molded product.

2. The method of fabricating an optical element which comprises rigidly securing together a plurality of mold parts to form a mold having the contour of said element, said parts being spaced from one another so as to permit movement thereof towards one another upon removal of the securing means, introducing a flowable partially polymerized polymerizable mass into said mold, which mass, in its hardened, partially polymerized condition, adheres to said mold and which is adapted, upon substantially complete polymerization, to form a transparent, inherently rigid mass, heating the mold and the contents thereof until the latter harden to produce a hard partially polymerized material to which the mold parts adhere, releasing the mold parts from one another without affecting the engagement between said parts and the surfaces of the hardened product defined by said parts, and advancing the polymerization of said product to produce a transparent, inherently rigid mass with the mold parts secured thereto.

3. The method of fabricating an optical element which comprises rigidly securing together a plurality of mold parts to form a mold having the contour of said element, said parts being spaced from one another so as to permit movement thereof towards one another upon removal of the securing means, introducing a flowable polymerizable mass into said mold, which mass, in its hardened, partially polymerized condition, adheres to said mold and which is adapted, upon substantially complete polymerization, to produce a transparent, inherently rigid mass, advancing the polymerization of said flowable mass to produce a hard, partially polymerized material to which the mold parts adhere, releasing the mold parts from one another without affecting the engagement between said parts and the surfaces of the hardened product defined by said parts, advancing the polymerization of said mass to substantial completion to produce a transparent, inherently rigid mass with said parts attached to the molded product, and removing said parts from said product.

4. The method of fabricating an optical element which comprises rigidly securing together a plurality of mold parts to form a mold having the contour of said element by means of an adhesive having a low melting point, said parts being spaced from one another so as to permit movement thereof towards one another upon removal of the adhesive, introducing a flowable polymerizable mass into said mold, which mass, in its hardened, partially polymerized condition, adheres to said mold and which is adapted upon substantially complete polymerization, to form a transparent, inherently rigid mass, advancing the polymerization of said flowable mass through its hardening stage at temperatures below the melting point of said adhesive, to produce a hard partially polymerized material to which the mold parts adhere, releasing the mold parts from one another without affecting the engagement between said parts and the surfaces of the hardened product defined by said parts by fusing said adhesive, and advancing the polymerization of said mass to substantial completion to produce a transparent, inherently rigid mass with said parts attached to the molded product.

5. The method of fabricating an optical element which comprises rigidly securing together a plurality of mold parts to form a mold having the contour of said element by means of an adhesive having a low melting point, said parts being spaced from one another so as to permit movement thereof towards one another upon removal of the adhesive, introducing a flowable polymerizable mass into said mold, which mass, in its hardened, partially polymerized condition, adheres to said mold and which is adapted, upon substantially complete polymerization, to produce a transparent, inherently rigid mass, advancing the polymerization of said flowable mass through its hardening stage at temperatures below the melting point of said adhesive to produce a hard partially polymerized material to which the mold parts adhere, releasing the mold parts from one another without affecting the engagement between said parts and the surfaces of the hardened product defined by said parts by fusing said adhesive, and advancing the polymerization of said mass to substantial completion to produce a transparent, inherently rigid mass with said parts attached to the molded product at a temperature above the melting point of said adhesive.

6. The method of fabricating a prism which comprises rigidly securing together a plurality of separated, optically flat plates to form a mold of the desired prismatic shape, said plates being spaced from one another so as to permit movement thereof towards one another upon removal of the securing means, introducing a flowable partially polymerized polymerizable mass into said mold, which mass, in its hardened, partially polymerized condition, adheres to said plates and which is adapted, upon substantially complete polymerization, to produce a transparent, inherently rigid mass, advancing the polymerization of said flowable mass to produce a hard partially polymerized material to which the mold parts adhere, releasing the plates from one another without affecting the surface engagement between said plates and the surface of the hardened mass defined thereby, and advancing the polymerization of said mass until substantial completion to produce a transparent, inherently rigid mass without removing said plates.

7. The method of forming a prism which comprises cementing together with a fusible cement a plurality of separated, optically flat plates to form a mold wherein each of said plates defines a side of said prism, said plates being spaced from one another so as to permit movement thereof towards one another upon removal of the cement, introducing a flowable partially polymerized polymerizable mass into said mold, which mass, in its hardened, partially polymerized condition, adheres to said plates and which is adapted, upon substantially complete polymerization, to produce a transparent, inherently rigid mass, advancing the polymerization of said flowable mass at a temperature below the melting point of said cement to produce a hard partially polymerized material to which the mold parts adhere, removing the cement from said plates without affecting the surface engagement between said plates and the surfaces of the hardened mass defined thereby by fusing said cement, and advancing the polymerization of said mass for a substantial time and at a temperature above the melting point of said cement to produce a transparent, inherently rigid mass without removing said plates.

8. The method of fabricating a prism which comprises rigidly securing together a plurality of separated, optically flat plates to form a mold of the desired prismatic shape, said plates being spaced from one another so as to permit movement thereof towards one another upon removal of the securing means, introducing a flowable partially polymerized polymerizable mass into said mold, which mass, in its hardened, partially polymerized condition, adheres to said plates and which is adapted, upon substantially complete polymerization, to produce a transparent, inherently rigid mass, advancing the polymerization of said flowable mass to produce a hard partially polymerized material to which the mold parts adhere, releasing the plates from one another without affecting the surface engagement between said plates and the surface of the hardened mass defined thereby, advancing the polymerization of said mass until substantial completion to produce a transparent, inherently rigid mass without removing said plates, and removing said plates from said mass by immersing said mass and said plates in a bath containing a surface active agent.

9. The method of fabricating a prism which comprises rigidly securing together a plurality of separated, optically flat plates to form a mold of the desired prismatic shape, said plates being spaced from one another so as to permit movement thereof towards one another upon removal of the securing means, introducing a flowable partially polymerized polymerizable mass into said mold, which mass, in its hardened, partially polymerized condition, adheres to said plates and which is adapted, upon substantially complete polymerization, to produce a transparent inherently rigid mass, heating the mold and the contents thereof until the latter harden to produce a hard partially polymerized material to which the mold parts adhere, releasing the plates from one another without affecting the surface engagement between said plates and the surfaces of the hardened mass defined thereby, and reheating the hardened prism with the plates secured to the surfaces thereof to substantially complete the polymerization to produce a transparent, inherently rigid mass.

10. The method of forming a prism which comprises rigidly securing together a plurality of separated optically flat glass plates so as to have the flat surfaces of the latter define said prism, said plates being spaced from one another so as to permit movement thereof towards one another upon removal of the securing means, introducing a plastic mass comprising a monomer into said mold, which mass in its hardened, partially polymerized condition, adheres to said plates and which is adapted, upon substantially complete polymerization, to produce a transparent, inherently rigid mass, heating the mold and the contents thereof to produce a hard partially polymerized material to which the mold parts adhere, releasing said plates for free movement relative to each other without disturbing the adhesion between said plates and the hardened mass, heating the mass with said plates attached thereto for a substantial period of time to produce a transparent, inherently rigid mass, and removing said plates at a temperature corresponding to the temperature at which the final heating is carried out.

11. The method of forming a prism which comprises securing together a plurality of separated glass plates by means of a fusible cement to form a mold of the desired prismatic shape, said plates being spaced from one another so as to permit movement thereof towards one another upon removal of the cement, introducing a fluid solution comprising monomeric plastic material into said mold, which solution in its hardened, partially polymerized condition, adheres to said plates and which is adapted, upon substantially complete polymerization, to form a transparent, inherently rigid mass, heating the mold at a temperature below the melting point of said cement to harden the solution to produce a hard partially polymerized material to which the mold adheres, raising the heating temperature to a point above the melting point of said cement, and maintaining the latter temperature to effect a substantial completion of the polymerization of the molded plastic to produce a transparent, inherently rigid mass.

12. The method of forming a prism which consists in securing together a plurality of separated glass plates by means of a fusible cement having a melting point between 40 degrees and 80 degrees C., said plates being spaced from one another so as to permit movement thereof towards one another upon removal of the cement, introducing a fluid mass comprising essentially styrene into said mold, which mass, in its hardened, partially polymerized condition, adheres to said plates and which is adapted, upon substantially complete polymerization, to form a transparent, inherently rigid mass, baking the mold and the contents thereof at a temperature of 25 to 40 degrees C. for over 24 hours to produce a hard, partially polymerized material to which the mold parts adhere, and then raising the baking temperature to 80 to 90 degrees C. and continuing the baking at the latter temperature until substantial completion of the polymerization of the mass within said mold to produce a transparent, inherently rigid mass.

13. The method of forming a prism which consists in securing together a plurality of separated glass plates by means of a fusible cement having a melting point between 40 degrees and 80 degrees C., said plates being spaced from one another so as to permit movement thereof towards one another upon removal of the cement, introducing a fluid mass comprising essentially styrene into said mold, which mass, in its hardened, partially polymerized condition, adheres to said plates and which is adapted, upon substantially complete polymerization to form a transparent, inherently rigid mass, baking the mold and the contents thereof at a temperature of 25 to 40 degrees C. for over 24 hours to produce a hard, partially polymerized material to which the mold parts adhere, and then raising the baking temperature to 80 to 90 degrees C. and continuing the baking at the latter temperature until substantial completion of the polymerization of the mass within said mold to produce a transparent, inherently rigid mass, and removing said plates from said mass by immersing said mass and said plates in a bath containing a surface active agent.

HOWARD G. ROGERS.
DEXTER P. COOPER, Jr.